United States Patent [19]

Borgen

[11] Patent Number: 5,436,943
[45] Date of Patent: Jul. 25, 1995

[54] DIGITAL AUDIO SIGNAL PROCESSING CIRCUIT

[75] Inventor: Gary Borgen, Camarillo, Calif.

[73] Assignee: The United States of America as represented by the Secretary of the Navy, Washington, D.C.

[21] Appl. No.: 897,647

[22] Filed: Jun. 12, 1992

[51] Int. Cl.$^6$ .................. H04L 7/00; H04L 25/36; H04L 25/40

[52] U.S. Cl. .................. 375/371; 375/373; 381/77; 331/2

[58] Field of Search ............ 375/118, 119, 371, 373; 381/2, 77

[56] References Cited

U.S. PATENT DOCUMENTS 5,266,908  11/1993  Koulopoulos et al. .............. 331/2

OTHER PUBLICATIONS

Meitner et al., "Time Distortions Within Digital Audio Equipment Due to Integrated Circuit Logic Induced Modulation Products", Audio Engineering Society, 91st Convention, Oct. 1991.

*Primary Examiner*—Stephen Chin
*Assistant Examiner*—William Luther
*Attorney, Agent, or Firm*—David Kalmbaugh; Melvin J. Sliwka

[57] ABSTRACT

A digital audio signal processing circuit for eliminating the amplitude and phase components of logic induced modulation from a left right clock signal, a bit clock signal and digital data bits generated by a digital signal processor within a compact disk player. The digital audio signal processing circuit includes a trio of optical couplers for removing the amplitude component of logic induced modulation from the left right clock signal, the bit clock signal and the digital data bits; a clock circuit for generating a system clock signal and a trio of D Flip-Flops for removing the phase component of logic induced modulation from the left right clock signal, the bit clock signal and the digital data bits and a digital to analog converter for separating the data bits into left channel data bits and right channel data bits and for converting the left channel data bits into a first analog signal and the right channel data bits into a second analog signal for use by speakers or the like to provide stereo sound. An isolated power supply provides both analog and digital voltages to the electronic elements of digital audio signal processing circuit.

6 Claims, 4 Drawing Sheets

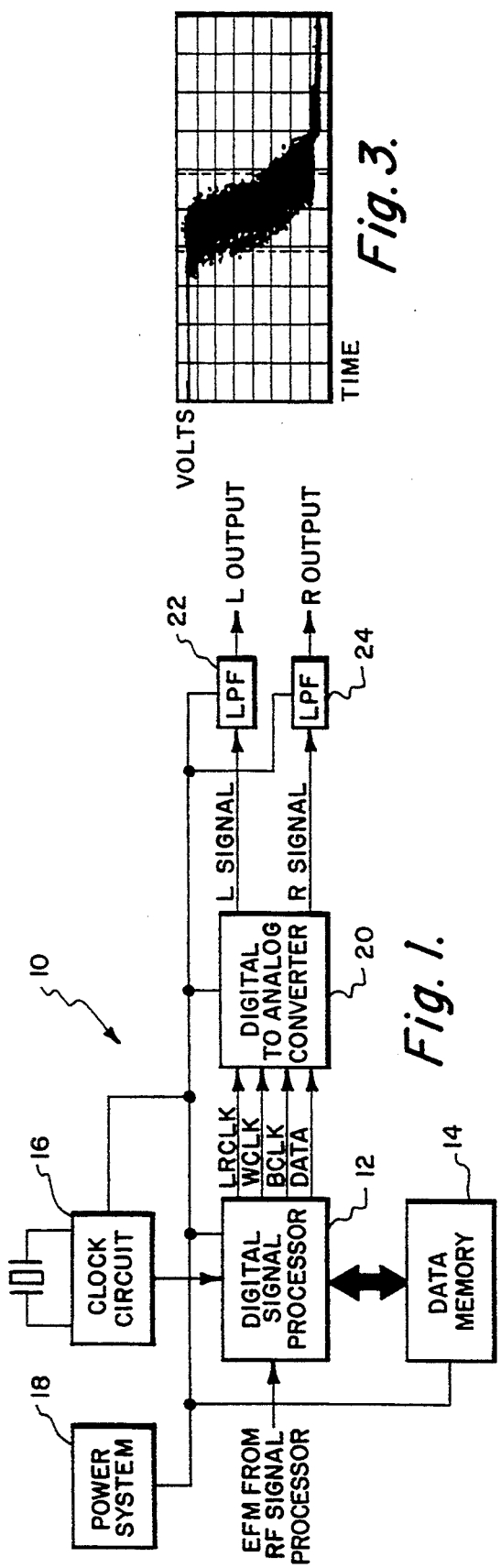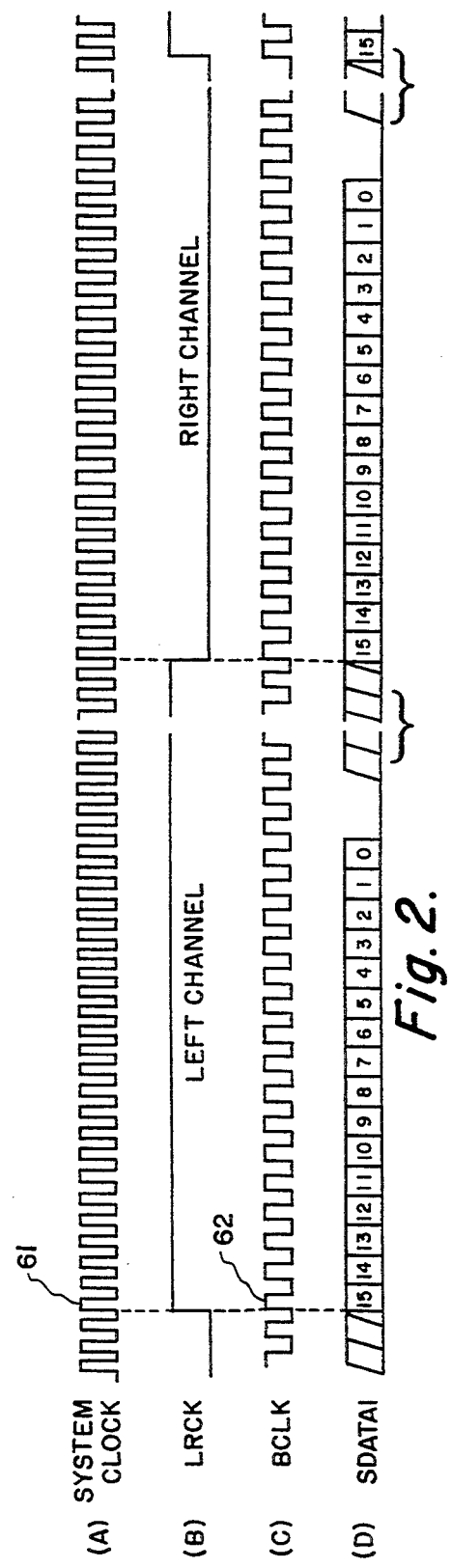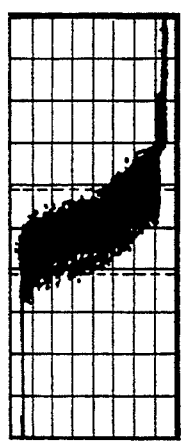

DIGITAL AUDIO SIGNAL PROCESSING CIRCUIT

BACKGROUND OF THE INVENTION

1. Field of the Invention

The present invention relates generally to digital signal processing circuitry and, in particular, to a digital audio signal processing circuit which eliminates system clock jitter from digital audio systems such as a compact disk player stereo system and the like.

2. Description of the Prior Art

In a digital audio system, such as a compact disk player stereo system, the quality of audio reproduction is dependent upon the accuracy and time displacement of each digital word converted to an analog pulse signal. As is best illustrated by FIG. 1, the last component in a typical digital audio system is a digital to analog conversion circuit which produces an analog signal that corresponds in magnitude to a digital word provided to the digital to analog conversion circuit. A digital to analog conversion circuit, for example, with sixteen bit accuracy will reproduce sixteen bit audio information to an accuracy of less than one least significant bit having a value of 1/65,536 of the analog full scale. The digital audio information is generally derived from a storage medium such as tape, disc or the like and the accuracy of the information is ensured through error checking and correction techniques programmed into and performed within the digital signal processor shown in FIG. 1.

The time placement of digitally converted signals in a digital audio system is dependent upon a conversion clock signal. Although there is accurate data representation, the conversion clock generally has a timing error of plus or minus one nanosecond. The timing error present in the conversion signal is defined as jitter.

The major functional blocks of the digital audio system of FIG. 1 are contained within large scale integrated circuits. These integrated circuits generally exhibit poor signal to power supply isolation among the numerous sub-function circuits/digital signal processing circuits within the integrated circuits of FIG. 1. The poor signal to power supply isolation facilitates complex mutual cross modulation among the sub-function circuits of the integrated circuits of FIG. 1. Logic induced modulation is the term used to describe this distortion producing mechanism. Clock signal phase errors are a result of logic induced modulation. Due to logic induced modulation, audio data is reproduced with time displaced samples.

One technique of the prior art used to remove jitter from digital audio systems is to introduce a reclocking circuit into the system which reduces clock jitter. Typically, reclocking techniques use a phase lock loop circuit before the digital to analog converter conversion clock signal input. These prior art phase lock loop circuits generally reduce absolute jitter from approximately the ten nonosecond region down to the five hundred picosecond region. However, due to poor power supply and signal isolation of the phase lock loop circuit, new tones may be created which cause distortion even though jitter is reduced.

Therefore it is an object of the present invention to provide an improved digital audio system.

It is a further object of the present invention to provide a means for substantially reducing jitter from digital audio systems.

It is yet a further object of the invention to provide a digital audio system which has signal and power isolation thereby substantially eliminating logic induced modulation.

It is still a further object of the present invention to provide an isolated power supply for the digital to analog converter of a digital audio system and thereby reduce peak-to-peak jitter below audible limits.

Various other advantages and novel features will become apparent to those skilled in the art as a more detailed description of the present invention is set forth below.

SUMMARY OF THE INVENTION

The present invention comprises a digital audio signal processing circuit for eliminating the amplitude and phase components of logic induced modulation from a left right clock signal, a bit clock signal and digital data bits generated by a digital signal processor within a compact disk player. The digital audio signal processing circuit includes a trio of optical couplers for removing the amplitude component of logic induced modulation from the left right clock signal, the bit clock signal and the digital data bits; a clock circuit for generating a system clock signal and a trio of D Flip-Flops for removing the phase component of logic induced modulation from the left right clock signal, the bit clock signal and the digital data bits and a digital to analog converter for separating the data bits into left channel data bits and right channel data bits and for converting the left channel data bits into a first analog signal and the right channel data bits into a second analog signal for use by speakers or the like to provide stereo sound. An isolated power supply provides both analog and digital voltages to the electronic elements of digital audio signal processing circuit.

BRIEF DESCRIPTION OF THE DRAWINGS

FIG. 1 is an electrical schematic of a typical digital audio system with which the present invention is adapted to be used;

FIGS. 2A-2D illustrate the clock and information signals occurring at the outputs of the digital signal processor of the digital audio system of FIG. 1;

FIG. 3 illustrates a peak-to-peak jitter measurement displaying the minimum and maximum jitter levels of a typical conversion clock signal within the digital audio system of FIG. 1 as measured by an oscilloscope over 676 sweeps.

DETAILED DESCRIPTION OF THE PREFERRED EMBODIMENT

Referring first to FIG. 1, there is shown a typical digital audio system 10, such as a compact disc player, which utilizes digital techniques for sound reproduction and the like.

In compact disc systems information is grouped into audio disk data frames before recording the frames on a disk. Each frame includes audio information from both a left and right audio channel, each frame has six samples per channel and each channel is representative of an analog audio signal. Transformation from analog to digital is performed by a 44.1 kilohertz sampling signal. The result of digital conversion is a 16 bit word which is split into two eight bit bytes. The eight bit bytes are next converted to fourteen bit bytes by the well known EFM conversion (eight to fourteen bit modulation) for storage on a compact disk. Each fourteen bit word upon being retrieved from the compact disk is supplied to digital signal processor 12 for conversion/demodulation to an eight bit byte. Two eight bit bytes are then combined by digital signal processor 12 to form each sixteen bit word illustrated by FIG. 2(C) with the first sixteen bit word of FIG. 2(C) being supplied to the left channel of digital audio system 10 for processing and the second sixteen bit word of FIG. 2(C) being supplied to the right channel of digital audio system 10 for processing thereby. Audio system 10 includes a clock circuit 16 which generates a clock signal having a frequency of 16.9344 megahertz. The clock signal is supplied to digital signal processor 12 which in response to the clock signal provides a LRCLK signal (left right clock signal) which has a frequency of 44.1 kilohertz; a WCLK signal (word clock signal) which has a frequency of 88.2 kilohertz and a BCLK signal (bit clock signal) which has a frequency of 2.1168 megahertz. The LRCLK and BCLK signals are respectively illustrated by FIGS. 2(B) and 2(C) and are used to clock the digital data of FIG. 2(D) into digital to analog converter 20. Digital to analog converter 20 separates the left and right channel words and then converts the left and right channel words respectively to left and right channel analog signals.

As is best illustrated by FIG. 3, logic induced modulation in the form of both amplitude modulation and phase modulation, modulates incoming and generated clock signals, such as the LRCLK and BCLK signals of FIG. 2, as well as digital logic bits such as the data bits of FIG. 2, thereby causing timing variations, that is jitter in these clock and data signals. This clock, in turn, causes severe degradation in digital audio sound reproduction.

Figure 4A:
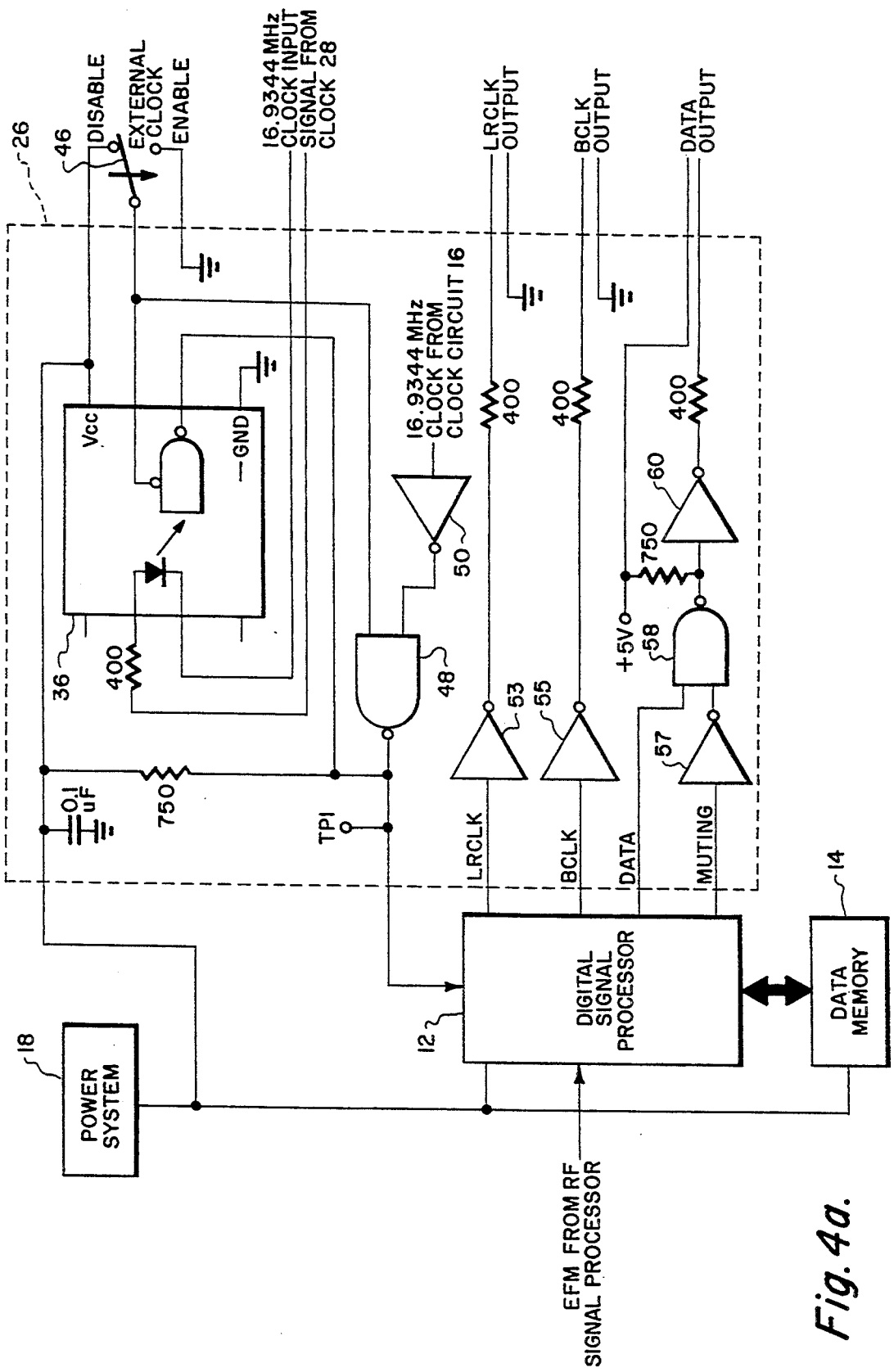
FIGS. 4(A)-4(C) is a detailed circuit diagram of the digital audio signal processing circuit constituting the present invention.
Figure 4B:
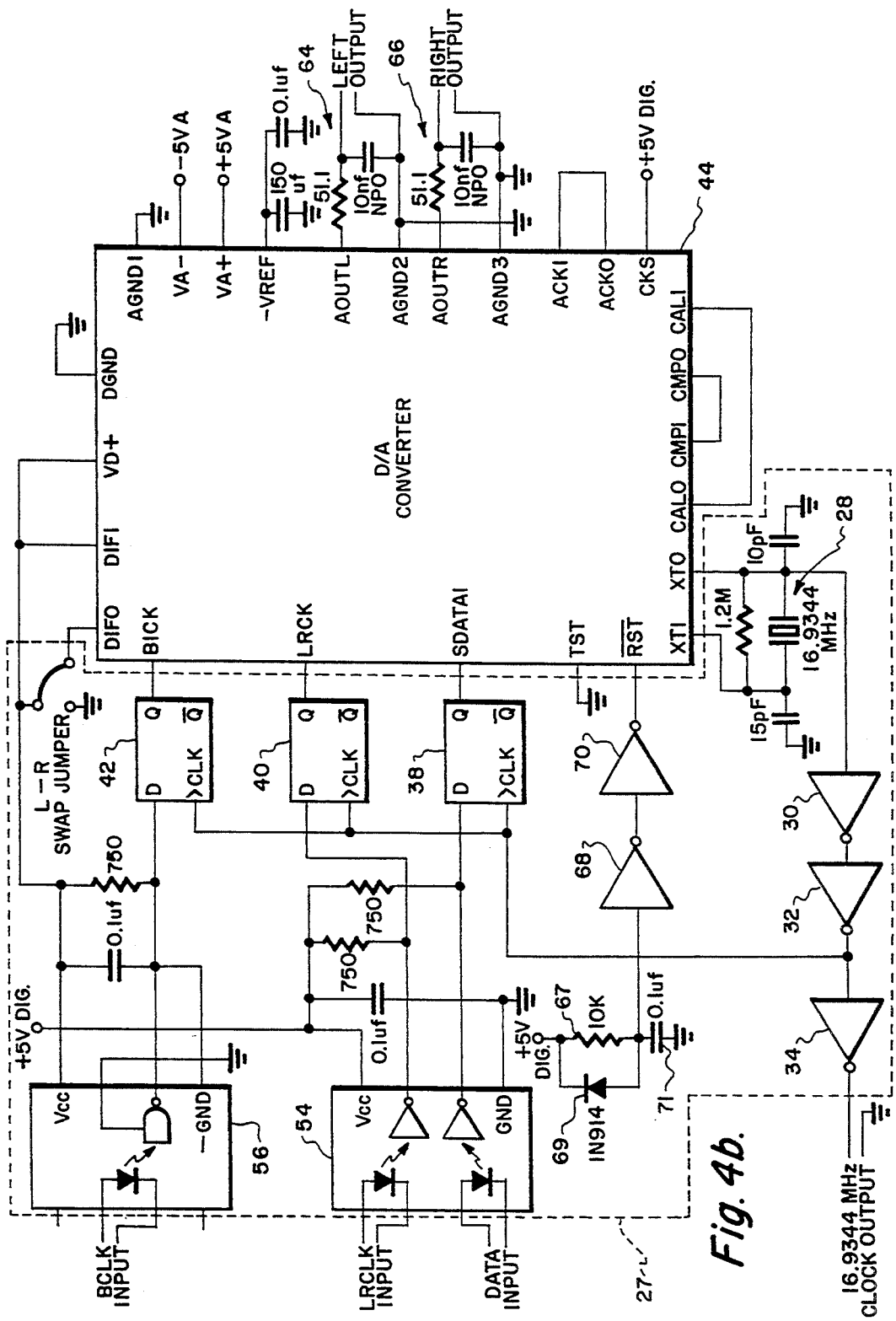

Referring to FIG. 4, there is shown the digital audio signal processing circuit designated generally by the reference numeral 26 in FIG. 4(A) and the reference numeral 27 in FIG. 4(B) which when used with the audio system of FIG. 1 will remove the jitter illustrated by FIG. 3 from the clock and data signals of FIG. 2. Digital audio signal processing circuit 27 includes a clock circuit 28 which generates a system clock signal, FIG. 2(A), having a frequency of 16.9344 megahertz, identical to the frequency of the clock signal for digital audio system 10 of FIG. 1. The system clock signal generated by clock circuit 28 is supplied through inverters 30, 32 and 34 and an optical coupler 36 to digital signal processor 12. Inverters 30, 32 and 34 buffer the 16.9344 megahertz system clock signal generated by clock circuit 28 which is also supplied to the clock inputs of D Flip-Flops 38, 40 and 42 as well as digital to analog converter 44. Optical coupler 36 isolates the 16.9344 megahertz system clock signal, FIG. 2(A), thereby substantially eliminating noise and output signal chatter generated by digital signal processor 12 and power system 18 from the 16.9344 megahertz system clock signal. Optical coupler 36 is, in turn, enabled by providing a logic zero from ground through a switch 46 to the enable input of optical coupler 36, while +5 VDC provided through switch 46 disables optical coupler 36. Optical coupler 36 also inverts the system clock signal generated by clock circuit 28, thus necessitating the use of inverter 34.

Digital audio signal processing circuit 26 includes a means whereby the 16.9344 megahertz clock signal generated by clock 16 may be tested. A logic one is supplied through switch 46 to the first input of a NAND gate 48 thereby enabling NAND gate 48 thereby allowing the 16.9344 megahertz clock signal generated by clock 16 to pass through inverter 50 and NAND gate 48 to test point TP1.

Referring to FIGS. 2 and 4, digital signal processor 12 in response to the 16.9344 megahertz system clock signal, FIG. 2(A), provided by clock 26 generates the LRCLK signal of FIG. 2(B) and the BCLK signal of FIG. 2(C). The LRCLK signal of FIG. 2(B) is supplied through inverter 53 and the first signal input of an optical coupler 54 to the D input of Flip-Flop 40. Optical coupler 54, in turn, isolates the LRCLK signal thereby removing the amplitude component of logic induced modulation in the LRCLK signal which is caused by digital signal processor 12 and power system 18. Similarly, the BCLK signal of FIG. 2(C) is supplied through an inverter 55 and the signal input of an optical coupler 56 to the D input of Flip-Flop 42. Optical coupler 56, in turn, isolates the BCLK signal thereby removing the amplitude component of logic induced modulation in the BCLK signal which is caused by digital signal processor 12 and power system 18.

When a logic zero is provided at the muting output of digital signal processor 12 and is supplied through an inverter 57 to a NAND gate 58, NAND gate 58 is enabled allowing each sixteen bit word, FIG. 2(D), provided at the data output of digital signal processor 12 to pass through NAND gate 58 and inverter 60 to the second signal input of optical coupler 54. Optical coupler 54 isolates each word of FIG. 2(D), thereby substantially eliminating noise and output signal chatter as well as the amplitude component of logic induced modulation generated by digital signal processor 12 and power system 18 from the data words of FIG. 2(D). Each data bit of the data words of FIG. 2(D) are next supplied to the D input of Flip-Flop 38.

The 16.9344 megahertz system clock signal of FIG. 2(A) is supplied to the clock inputs of Flip-Flops 38, 40 and 42. The leading edge of clock pulse 61, FIG. 2(A) synchronously clocks the left channel logic signal to the Q output of Flip-Flop 40, bit clock pulse 62 to the Q output of Flip-Flop 42 and the fifteenth data bit of the left channel word to the Q output of Flip-Flop 38. In a like manner, successive clock pulses of the system clock signal of FIG. 2(A) continue to synchronously clock the left and right channel logic signals, FIG. 2(B), to the Q output of Flip-Flop 40, the clock pulses of the BCLK signal, FIG. 2(C), to the Q output of Flip-Flop 42 and the succeeding data bits of the left channel and right channel words of FIG. 2(D) to the Q output of Flip-Flop 38. By synchronously clocking the signals of FIG. 2 from the D inputs to the Q outputs of Flip-Flops 38, 40 and 42, the phase component of logic induced modulation is removed from the signals of FIG. 2.

The left channel logic word of FIG. 2(B), the clock pulses of the BCLK signal, FIG. 2(C) and the sixteen data bits of the left channel word of FIG. 2(D) are respectively supplied to the LRCK input, the BICK input and the SDATAI input of digital to analog converter 44. Digital to analog converter 44 then converts the sixteen data bits of the left channel word to an analog voltage which is provided to AOUTL output of converter 44. In a similar manner, digital to analog converter 44 converts the sixteen data bits of the right channel word to an analog voltage which is provided to the AOUTR output of converter 44. The left channel analog output signal provided the AOUTL output of converter 44 is supplied to a low pass filter 64, while the right channel analog output signal provided the AOUTR output of converter 44 is supplied to a low pass filter 66. Filters 64 and 66 each consist of a series connected 51.1 ohm resistor and 0.01 microfarad capacitor connected between ground and the 51.1 ohm resistor.

At this time it should be noted that the digital to analog converter 44 used in the preferred embodiment of the present invention is a Model CS4328 eighteen bit D/A converter manufactured by Crystal Semiconductor Corporation. The CS4328 digital to analog converter 44 is designed for compatibility with digital audio systems and will accept the standard audio frequencies 44.1 kHz (the frequency of the LRCK signal of FIG. 2(B)), 32 kHz and 48 kHz. Data is input to converter 44 via the SDATAI input which is the serial data input for the sixteen data bits of the left and right channel words of FIG. 2(D). The BICK input is the serial data clock input for the bit clock of FIG. 2(C). The LRCK input is the input for the clock signal of FIG. 2(B) which defines the channel and delineation for each word of FIG. 2(D). Digital to analog converter 44 also includes a RST (reset) input which is active at the logic zero state and a master clock (XTI/XTO) input to which circuit 28 is connected. The frequency of the clock signal provided to the XTI/XTO input is determined by the frequency of the desired word rate and the setting of the CSK (Clock Select) input. When the CSK input is at the logic one state and the clock signal supplied to the XTI/XTO input has a frequency of 16.934 MHz, converter 44 will process data, that is the left and right channel words of FIG. 2(D) at a frequency of 44,100 words for each channel per second.

Digital audio signal processing circuit 26 also includes means for providing the logic zero required to reset digital to analog converter 44 comprising a 10 Kohm resistor 67 connected between +5 VDC and the input of an inverter 68, a reverse biased charge bleeder diode 69 connected in parallel with the resistor, a 0.1 microfarad capacitor 71 connected between ground and the input of inverter 68 and an inverter 70 connected between the output of inverter 68 and the/RST input of digital to analog converter 44. When power to circuit 26 is turned on a logic zero occurs at the input of inverter 68 resulting in a logic zero being supplied to the/RST input of converter 44 until capacitor is charged to approximately +5 VDC which results in a logic one being supplied to the/RST input of converter 44.

At this time it should be noted that optical couplers 36 and 56 are Hewlett Packard Model HCPL-2400 Optocouplers, optical couplers 54 is a TRW Model OPI2630 Optically Coupled Isolator, D Flip-Flops 38, 40 and 42 are Texas Instruments SN74HC74 Flip-Flops, NAND gates 48 and 58 are Texas Instruments SN74HC03 NAND gates and Inverters 30, 32, 34, 50, 53, 55, 57, 60, 68 and 70 are Texas Instruments SN74HC04 inverters.

Figure 4C:
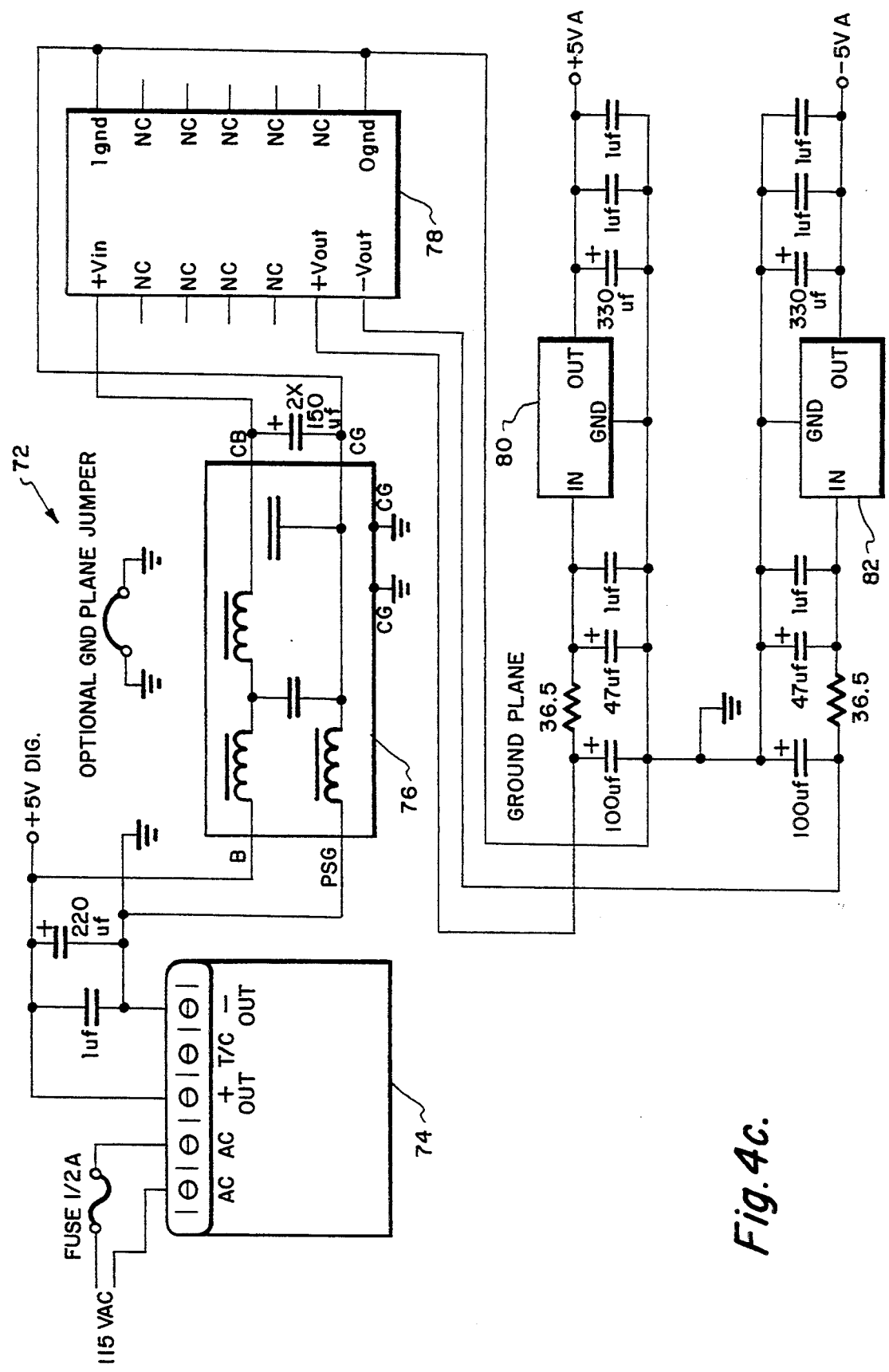

Referring to FIG. 4(C), digital audio signal processing circuit 26 uses a power supply 72 to supply +5 VDC to the integrated circuits of processing circuit 26 including optical couplers 54 and 56 and digital to analog converter 44. Power supply 72 is used as an isolated power supply which is separate from power supply 18 and which provides both digital and analog direct current voltages to the digital logic and analog elements of circuit 26. Power supply 72 provides a clean power source for clock circuit 28 thereby substantially reducing the effects of logic induced modulation on the digital logic and analog elements of circuit 26.

Power supply 72 includes a 115 VAC to 5 VDC power module 74 for converting 115 volts alternating current to 5 volts direct current. The 5 VDC is then supplied to the logic components of digital audio signal processing circuit 26 including optical coupler 54 and 56 and the VD+ digital power input of digital to analog converter 44. The 5 VDC is also supplied through a filter 76 to the $+V_{in}$ input of a DC to DC converter 78 which converts 5 VDC to +12 VDC and −12 VDC. Filter 76, in turn, prevents noise generated by converter 78 from being fed back to power module 74.

The +12 VDC is supplied to a voltage regulator 80 which converts the +12 VDC to +5 VDC and then supplies the +5 VDC to the VA+ input of converter 44 which is the positive analog power input for converter 44. In a like manner, the −12 VDC is supplied to a voltage regulator 82 which converts the −12 VDC to −5 VDC and then supplies the −5 VDC to the VA− input of converter 44 which is the negative analog power input for converter 44. Converter 78 has the advantage of having its fundamental switching frequency (approximately 150 kilohertz) above the audio reproduction range, thus providing an additional means for decreasing signal contamination, that is jitter.

At this time it should be noted that power module 74 is an Acopian Model 5EB150 power module, filter 76 is a Murata Erie Model BNX002-01 filter, converter 78 is an Integrated Circuits Model DIP371212DP switching regulator, regulator 80 is National Semiconductor Model LM 7805 voltage regulator and regulator 82 is a National Semiconductor Model LM 7905 voltage regulator.

Digital audio signal processing circuit 26 is adapted for use with any compact disk 10, FIG. 1, such as a Sony Model CDP-C500 compact disk player which uses EFM conversion for retrieval of data from a compact disk and which operates at standard audio frequencies such as 48 kHz, 44.1 kHz and 32 kHZ. It should be understood that a variation of the present invention may be used to convert analog sound signals to digital data for storage on a compact disk. Further, the present invention may be used in conjunction with AES/EBM, S/PDIF and EIAJ Digital Audio receivers and transmitters.

It is therefore to be understood that many modifications and variations of the present invention are possible in light of the above teachings. It is therefore to be understood that within the scope of the appended claims that the invention may be practiced otherwise than as specifically described.

What is claimed is:

1. A digital audio signal processing circuit for eliminating jitter from a left right clock signal, a bit clock signal and digital data words generated by a digital signal processor, said digital signal processor having a clock input and a muting output, said digital audio processing circuit comprising:

a first inverter having an input adapted to receive said left right clock signal and an output;

a second inverter having an input adapted to receive said bit clock signal and an output;

a first optical coupler having a signal input connected to the output of said first inverter, an enable input and a signal output;

a second optical coupler having a signal input connected to the output of said second inverter, an enable input and a signal output;

a first Flip-Flop having a data input connected to the signal output of said first optical coupler, a clock input and an output;

a second Flip-Flop having a data input connected to the signal output of said second optical coupler, a clock input and an output;

a third inverter having an input connected the muting output of said digital signal processor and an output;

a first NAND gate having a first input adapted to receive said digital data words, a second input connected to the output of said third inverter and an output;

a third optical coupler having a signal input connected to the output of said first NAND gate, an enable input and a signal output;

a third Flip-Flop having a data input connected to the signal output of said third optical coupler, a clock input and an output;.

a digital to analog converter having a left right clock input connected to the output of said first Flip-Flop, a bit clock input connected to the output of said second Flip-Flop, a serial data input connected to the output of said third Flip-Flop, a reset input, a clock input, a digital power input, positive and negative analog power inputs and first and second analog signal outputs;

a clock circuit having an output connected to the clock inputs of said first, second and third Flip-Flops and the clock input of said digital to analog converter;

a power supply having a digital power output connected to the enable inputs of said first, second and third optical couplers and the digital power input of said digital to analog converter, a positive analog power output connected to the positive analog power input of said digital to analog converter and a negative analog power output connected to the negative analog power input of said digital to analog converter;

a fourth optical coupler having a signal input connected to the output of said clock circuit, an enable input and a signal output connected to the clock input of said digital signal processor; and a fourth inverter connected between the output of said clock circuit and the signal input of said fourth optical coupler.

2. The digital audio signal processing circuit of claim 1 further comprising a first low pass filter connected to the first analog signal output of said digital to analog converter and a second low pass filter connected to the second analog signal output of said digital to analog converter.

3. The digital audio signal processing circuit of claim 1 further comprising a circuit for resetting said digital to analog converter, said circuit comprising:

fifth and sixth inverters connected in series, each of said inverters having an input and an output, the output said sixth inverter being connected to the reset input of said digital to analog converter;

a series connected resistor and capacitor, said resistor being connected to the digital power output of said power supply and said capacitor being connected to ground, the input of said fifth inverter being connected between said resistor and said capacitor; and a diode having an anode connected to the input of said fifth inverter and a cathode connected to the digital power output of said power supply.

4. The digital audio signal processing circuit of claim 1 wherein said power supply comprises:

a power module having an input adapted to receive one hundred fifteen volts alternating current and an output connected to the enable inputs of said first, second and third optical couplers and the digital power input of said digital to analog converter;

a direct current to direct current converter having an input connected to the output of said power module, a positive voltage output and a negative voltage output;

said direct current to direct current converter operating at a frequency substantially above the audio frequency range;

a first voltage regulator having an input connected to the positive voltage output of said converter and an output connected to the positive analog power input of said digital to analog converter; and a second voltage regulator having an input connected to the negative voltage output of said converter and an output connected to the negative analog power input of said digital to analog converter.

5. A digital audio signal processing circuit for eliminating jitter from a left right clock signal, a bit clock signal and digital data words provided by a digital signal processor to a digital to analog converter, said digital signal processor having a muting output and a clock input, said digital to analog converter having a left right clock input, a bit clock input, a serial data input and a clock input, said digital audio signal processing circuit comprising:

a first inverter having an input adapted to receive said left right clock signal and an output;

a second inverter having an input adapted to receive said bit clock signal and an output;

a first optical coupler having a signal input connected to the output of said first inverter, and a signal output;

a second optical coupler having a signal input connected to the output of said second inverter and a signal output;

a first Flip-Flop having a data input connected to the signal output of said first optical coupler, a clock input and an output connected to the left right clock input of said digital to analog converter;

a second Flip-Flop having a data input connected to the signal output of said second optical coupler, a clock input and an output connected to the bit clock input of said digital to analog converter;

a third inverter having an input connected the muting output of said digital signal processor and an output;

a first NAND gate having a first input adapted to receive said digital data words, a second input connected to the output of said third inverter and an output;

a fourth inverter having an input connected to the output of said first NAND gate and an output a third optical coupler having a signal input connected to the output of said fourth inverter, an enable input and a signal output;

a third Flip-Flop having a data input connected to the signal output of said third optical coupler, a clock input and an output connected to the serial data input of said digital to analog converter;

a clock circuit having an output connected to the clock inputs of said first, second and third Flip-Flops;

a fifth inverter having an input connected to the output of said clock circuit and an output; and a fourth optical coupler having a signal input connected to the output of said fourth inverter, an enable input and a signal output connected to the clock input of said digital signal processor.

6. The digital audio signal processing circuit of claim 5 further comprising:

a sixth inverter having an input for receiving an external clock signal and an output;

a second NAND gate having a first input connected to the output of said sixth inverter, a second input and an output connected to the clock input of said digital signal processor; and a switch having a first input for receiving a logic one signal, a second input for receiving a logic zero signal and an output connected to the second input of said second NAND gate and the enable input of said fourth optical coupler.

* * * * *